United States Patent [19]

Chen

[11] Patent Number: 5,238,281

[45] Date of Patent: Aug. 24, 1993

[54] CAR CAPABLE OF SHOWING VIDEO IMAGES

[76] Inventor: Shih-Chung Chen, P.O. Box 10780, Taipei, Taiwan

[21] Appl. No.: 676,355

[22] Filed: Mar. 28, 1991

[51] Int. Cl.$^5$ ............................................. B60R 13/00
[52] U.S. Cl. ..................................... 296/21; 296/24.1
[58] Field of Search ................ 296/21, 24.1, 181, 183

[56] References Cited

U.S. PATENT DOCUMENTS

| 676,822 | 6/1901 | Neumayer | 296/21 X |
| 1,230,369 | 6/1917 | Bayers | 296/21 |
| 1,813,542 | 7/1931 | Owens | 296/21 X |

FOREIGN PATENT DOCUMENTS

| 3243730 | 5/1984 | Fed. Rep. of Germany | 296/21 |
| 2620983 | 3/1989 | France | 296/21 |
| 455450 | 3/1950 | Italy | 296/21 |

Primary Examiner—Margaret A. Focarino
Assistant Examiner—Andrew C. Pike

[57] ABSTRACT

An advertising car includes screens installed in the side and/or the rear of the car. Projectors disposed within the car project light rays directly, or indirectly, onto the screens to display video images. The light rays from two different projectors intersect within the car.

2 Claims, 4 Drawing Sheets

CAR CAPABLE OF SHOWING VIDEO IMAGES

FIELD OF THE INVENTION

The present invention relates generally to a car which is capable of showing video images, and particularly an advertising car capable of supplying video images.

BACKGROUND OF THE INVENTION

The advertisements on the outside of the cars have always been static two-dimensional pictures, the visual and audio effects thereof being unsatisfactory. Even if the pictures are very vivid, they just flash by when the cars are driving fast past the pedestrians, who are therefore unable to grasp the theme of the advertisements.

In a thriving commercial society, the use of advertising to promote goods or services is extremely important. The propagation of government decrees, campaigns, social activities, and the like is not likely to achieve the desired results if the promotion still stays at the level of using static pictures or signs.

SUMMARY OF THE INVENTION

In view of the aforesaid drawbacks in conventional advertising, it is a primary object of the present invention to provide a mobile advertising car with large projection screens which can be easily installed in the sides, the rear, and/or the front of the car. Therefore, even if the car is moving on the road and the advertised message cannot be clearly obtained from the side screen at a distance, when the car drives past, the content of the advertisements can still be communicated to the pedestrians via the side or the rear screen, accomplishing the object of advertising.

Although the advertising car according to the present invention provides a projection screen larger than that of ordinary large television sets, because of the structural characteristics of the present invention (to be hereinafter described), the screen can be economically manufactured and fast installed.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
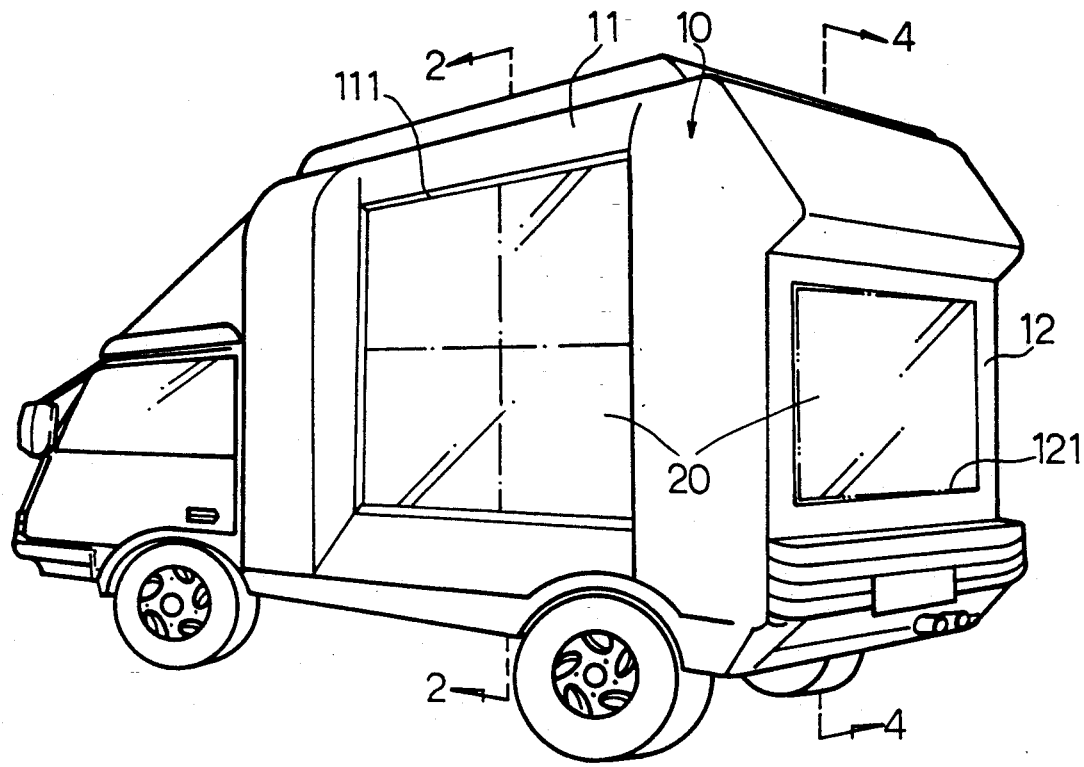
FIG. 1 is a perspective view of the present invention.
Figure 7:
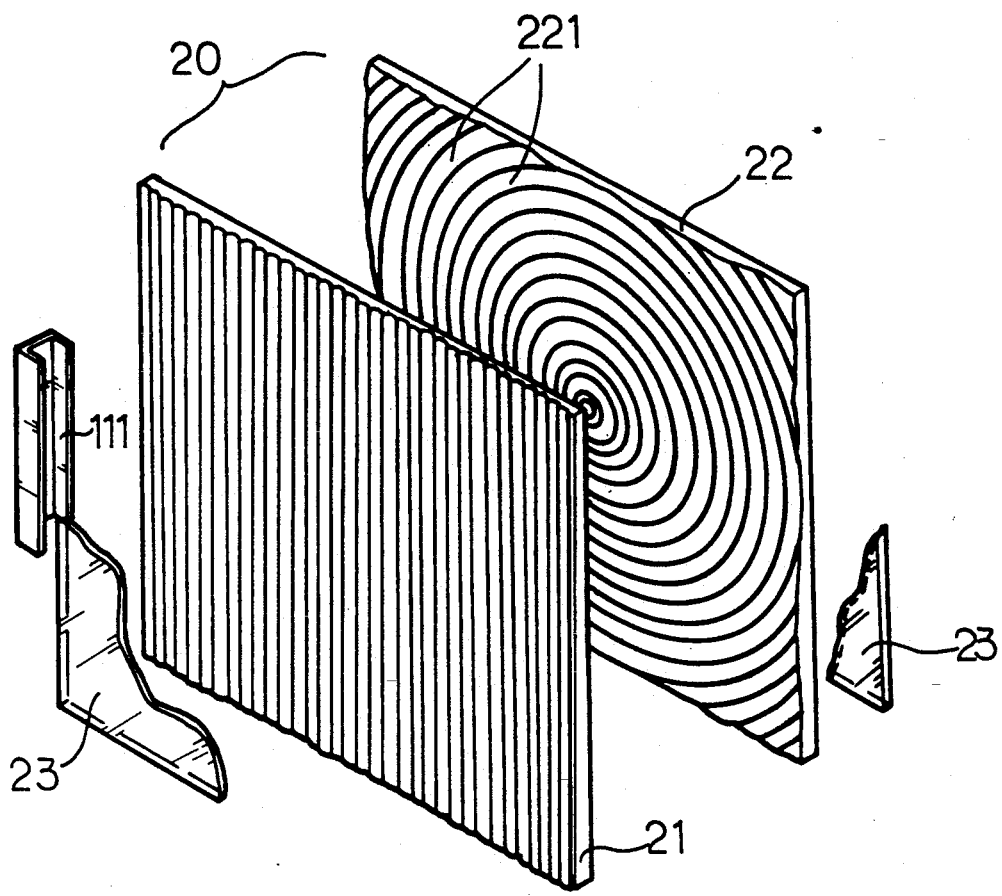
FIG. 7 is a partial perspective view of the projection screen, showing the structure of another embodiment of the projection screen.
Figure 6:
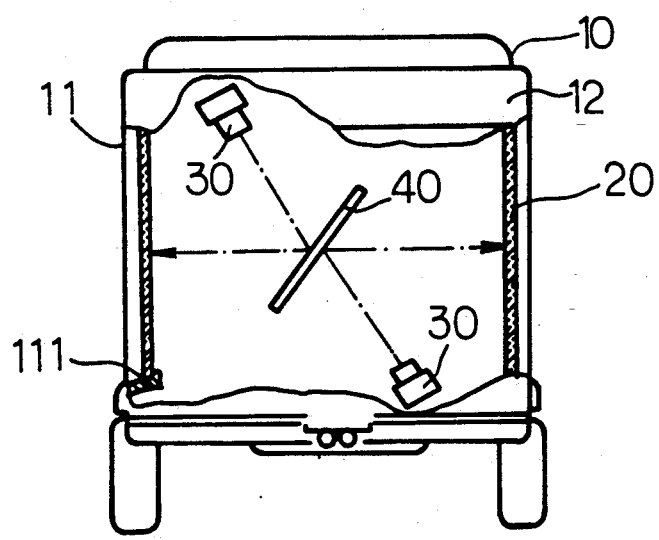
FIG. 6 is a cross-sectional view of FIG. 5 taken along line 6—6.

With reference to the drawings, a car 10 according to the present invention is provided with a large window 111 or 121 in at least one of the sides 11 or the rear 12 thereof. Preferably, a window is formed in one of the sides and in the rear, and the plate-like projection screen 20 is securely inserted into each of the windows. A preferred embodiment of the screen is shown FIGS. 1 and 7. It consists of a projection lens 21 and a Fresnel lens 22 with one side provided with concentric projection lens elements 221. If the projection screen 20 consists of four lenses, as shown by dotted lines in FIG. 1, it is preferably to be disposed between two sheets of transparent protective lenses 23. Alternatively, it is also possible to integrally combine the projecting lens 21 and the Fresnel lens 22, and even the protective lenses 23, to form the projection screen 20.

Figure 4:
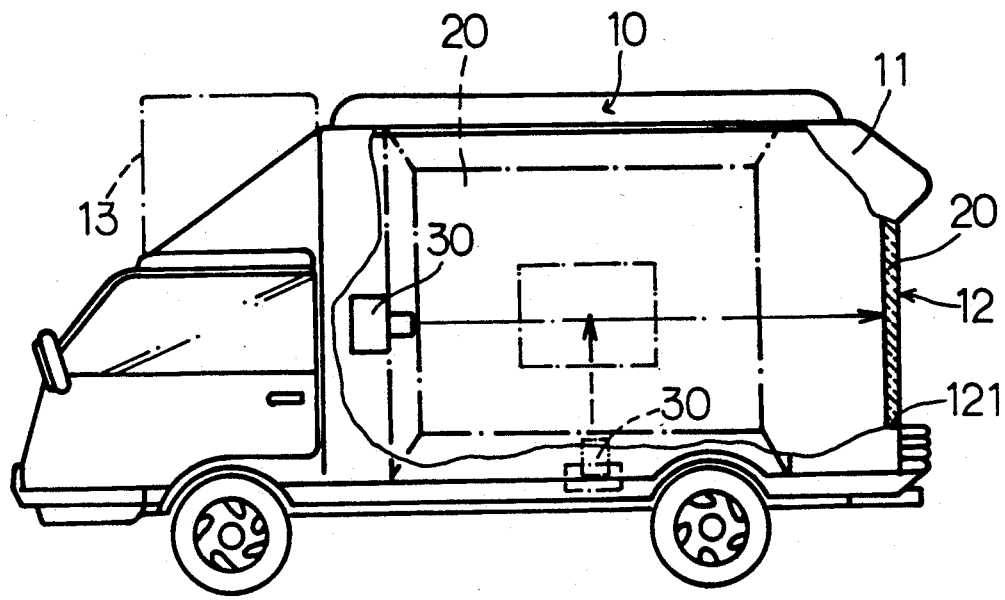
FIG. 4 is a cross-sectional view of FIG. 1 taken along line 4—4.
Figure 5:
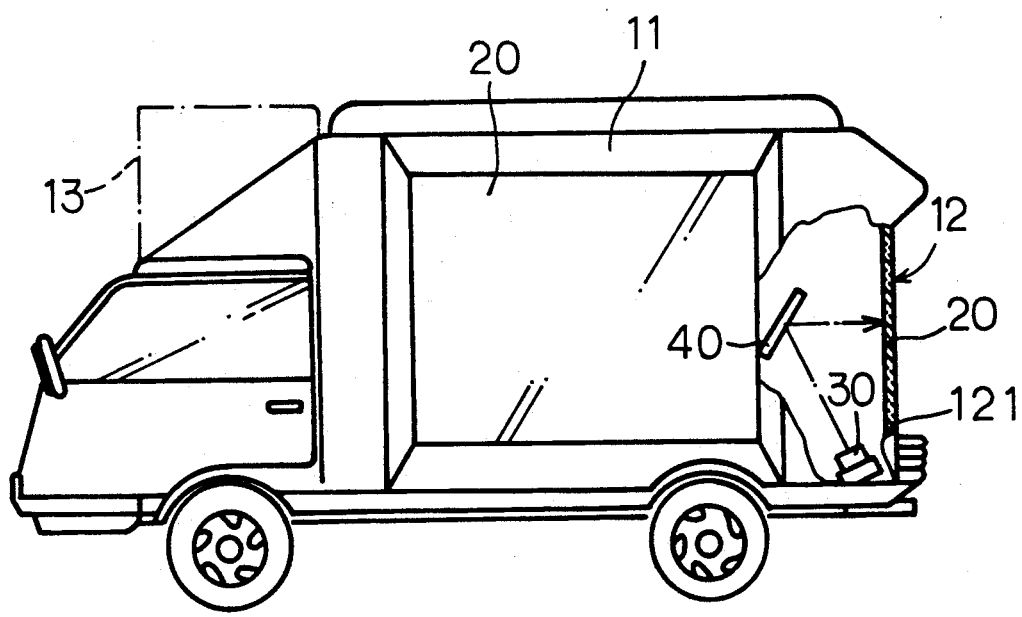
FIG. 5 is a cross-sectional view similar to FIG. 4, showing another embodiment.
Figure 8:
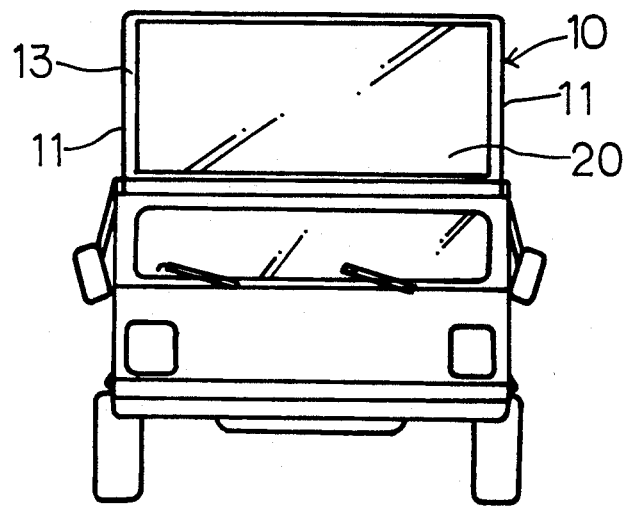
FIG. 8 is a front view of a further embodiment according to the present invention.

In another embodiment of the present invention, as shown by the dotted lines in FIGS. 4 and 5, and FIG. 8, a projection screen 20 can also be provided in the front 13 of the car, preferably in the space above the driver's seat, so that all four sides of the car are provided with screens, greatly enhancing the effects of the commercials.

Figure 2:
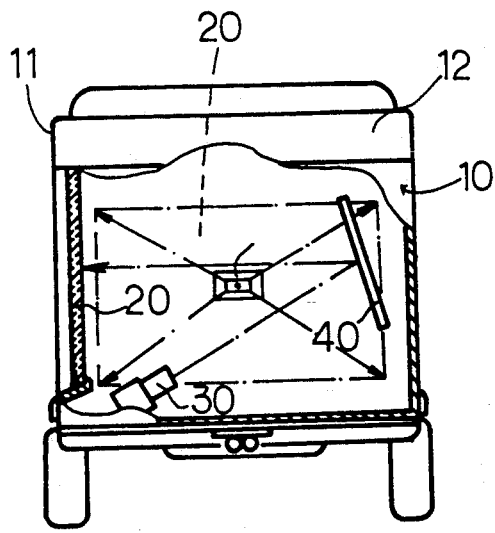
FIG. 2 is a cross-sectional view of FIG. 1 taken along line 2—2.
Figure 3:
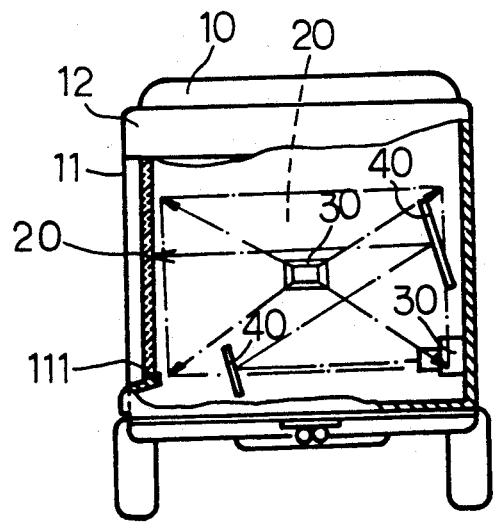
FIG. 3 is a cross-sectional view similar to FIG. 2, showing another embodiment wherein similar visual effects are achieved by two-time reflection.

No matter in which side of the car the projection screen 20 is disposed, in substantially the central region of the screen 20, light rays are provided to produce video images. The light rays may be either directly projected from a projector 30 as shown in FIG. 4, or reflected by reflecting lens 40 as shown in FIG. 2, or twice reflected as shown in FIG. 3. Certainly it is also possible to mount an antenna on the car top to receive video signals which are then projected to appear on the screen. Adopting the characteristics of the present invention in projecting slides or motion pictures is one of the many modifications of the invention and should be considered as within the scope of this invention. Since the projector according to the present invention is not the conventional picture tube used in television, the technique of reflection as illustrated in FIGS. 2 and 3 may be used to obtain a comparatively larger image within the limited space of the car of just a little installation cost of the reflecting lenses.

As shown in FIGS. 2, 3, and 4, the car according to the present invention has a projection screen 20 in one of the sides and in the rear. Video images displayed on each projection screen 20 are projected from its corresponding projector 30 disposed within the car. Although the video images are projected by different projectors 30, the video signals of the projectors 30 may be supplied by the same, or different, video-tape recorder. With reference to FIGS. 2, 3, and 4, it can be observed that light rays from two different projectors 30 intersect. When light rays from two projectors 30 intersect, the images that form on the corresponding screens are comparatively larger than when the light rays do not intersect.

FIG. 4, 5, 6, and 8 show alternate embodiments according to the present invention wherein the projection screens are provided in the front, the side, and/or the rear. All these embodiments of the advertising car according to the present invention may achieve better advertising results.

From the above description and illustration, it can be understood that the present invention provides a new advertising car which can overcome the disadvantages of static advertisements displayed on cars. At the same time, commercials shown on the screen of the advertising car can be watched first from the front, then the side and the rear in a series, accomplishing the object of advertising efficiently, such an advantage being an improvement on prior art. As for sound-effects producing devices, they can be arranged in any corner of the car, and it is not considered necessary to describe them in detail here.

Although the present invention has been illustrated and described with reference to the preferred embodiments thereof, it should be understood that it is in no way limited to the details of such embodiments, but is capable of numerous modifications within the scope of the appended claims.

What is claimed is:

1. A car capable of showing video images, said car comprising:
    two projection screens, one of which being securely inserted in a window provided in one side of said car, and the other being inserted in a window provided in a rear of said car; and
    two projecting devices, each corresponding to one of said projection screens and disposed within said car to project light rays directly, or indirectly by use of at least one-time reflection, onto the corresponding projection screen to produce video images on the corresponding projection screen thereof;
    wherein said light rays from said two projecting devices disposed within said car intersect.

2. A car capable of showing video images according to claim 1, wherein at least one of said projection screens consists of a multiplicity of lenses.

* * * * *